United States Patent [19]
MacDonald

[11] Patent Number: 6,134,357
[45] Date of Patent: Oct. 17, 2000

[54] OPTICAL SWITCHING SYSTEM

[75] Inventor: Robert I. MacDonald, Manotick, Canada

[73] Assignee: JDS Fitel Inc., Ottawa, Canada

[21] Appl. No.: 09/120,289

[22] Filed: Jul. 22, 1998

[30] Foreign Application Priority Data

Jul. 24, 1997 [CA] Canada ................................ 2211395

[51] Int. Cl.[7] ...................................................... G02B 6/26
[52] U.S. Cl. ................................ 385/16; 385/17; 385/18; 385/20
[58] Field of Search ............................... 385/16, 17, 18, 385/19, 20, 24

[56] References Cited

U.S. PATENT DOCUMENTS

| | | |
|---|---|---|
| 5,127,067 | 6/1992 | Decoco et al. ................................ 385/24 |
| 5,903,686 | 5/1999 | MacDonald ................................ 385/16 |
| 5,960,132 | 9/1999 | Lin ................................................ 385/18 |
| 5,991,476 | 11/1999 | Baney et al. ................................ 385/16 |

FOREIGN PATENT DOCUMENTS 406003556  1/1994  Japan ........................................ 385/24

Primary Examiner—Darren Schuberg
Assistant Examiner—Fayez Assaf
Attorney, Agent, or Firm—Neil Teitelbaum

[57] ABSTRACT

An optical switching system particularly useful in optical networks where waveguides are required from one node to several others, to provide multiple paths in the event of an outage on a particular waveguide is provided. The switching system is a one sided switch having p ports and allows any of the p ports to be connected with any other of the p-1 ports.

8 Claims, 3 Drawing Sheets

OPTICAL SWITCHING SYSTEM

FIELD OF THE INVENTION

This invention relates to optical switches of the kind which allow an optical signal to be switched between a single input optical waveguide or fiber and a plurality of output waveguides or optical fibers (hereinafter referred to simply as optical fibers), or between a plurality of input optical fibers and a single output optical fiber.

Optical fiber switches are known having a linear or circular array of optical fiber ends, which may be the ends of output fibers, and a relatively movable single fiber end, for example the end of an input fiber, which can be moved selectively into juxtaposition to each of the output fiber ends in turn so that a light signal can be switched from the input fiber to any one of the output fibers. Switches of this kind are shown, for example in the following U.S. patents:

U.S. Pat. No. 4,378,144, issued Mar. 29, 1983 to Duck et al.;

U.S. Pat. No. 4,834,488, issued May 30, 1989 to Lee;

U.S. Pat. No. 4,896,935, issued Jan. 30, 1990 to Lee;

U.S. Pat. No. 5,317,659, issued May 31, 1994 to Lee; and

U.S. Pat. No. 5,420,946, issued May 30, 1995 to Tsai.

Essentially, the function of an optical switch is to efficiently couple light from one optical fiber to another.

As telecommunication networks have evolved over the years and become more complex, a need has arisen for a matrix switching system capable of optically coupling any one of a large number of other fibers. As well, it has been preferred for the switching system to be preferably "non-blocking", i.e. the switching of one input fiber to an output fiber should not interfere with the light transmission of any other input fiber to any other output fiber.

Two sided optical switches allow a set of ports, for example, input ports on a first side of a switch, to be connected with a set of output ports on another side of the switch. A bi-directional matrix switch, for example n×m optical switch is a two sided switch having p=n+m ports that allows n ports to be coupled with m other ports such that light launched in any one of the n ports can be coupled with any of the m ports, and vice versa. Although these matrix switches adequately perform their intended function, there is a need for a one sided optical switch having at least three ports that will allow any port to be coupled with any other port. Such a switch would be particularly advantageous in the field of optical networks, where it is desired to have plurality of network nodes interconnected, to provide alternative paths between nodes, in the event of failure or outage of a particular path.

Thus, it is an object of the invention to provide a switch that is particularly useful in optical network applications.

It is a further object of the invention to provide an optical switch having a plurality of ports wherein any port can be interconnected with any other port.

SUMMARY OF THE INVENTION

In accordance with the invention, there is provided, an optical switching system comprising p ports for receiving optical energy; and, means for optically connecting any of the n ports with any other of the n ports, where $p \geq 3$.

In accordance with the invention, there is provided, an optical switching system, comprising a plurality of interconnected optical switches, each switch comprising p ports for receiving optical energy; and, wavelength independent means for optically connecting any of the p ports with any other of the p ports, where $p \geq 3$.

In accordance with the invention, there is provided an optical switching system having p input or/and output ports, at least a pair of one of the p input or/and output ports being optically coupled, that allow light launched into one of the p output or/and input ports to be directed to any other of the p output or/and input ports.

BRIEF DESCRIPTION OF THE DRAWINGS

Exemplary embodiments of the invention will now be described in conjunction with the drawings, in which.

DETAILED DESCRIPTION

Figure 1:
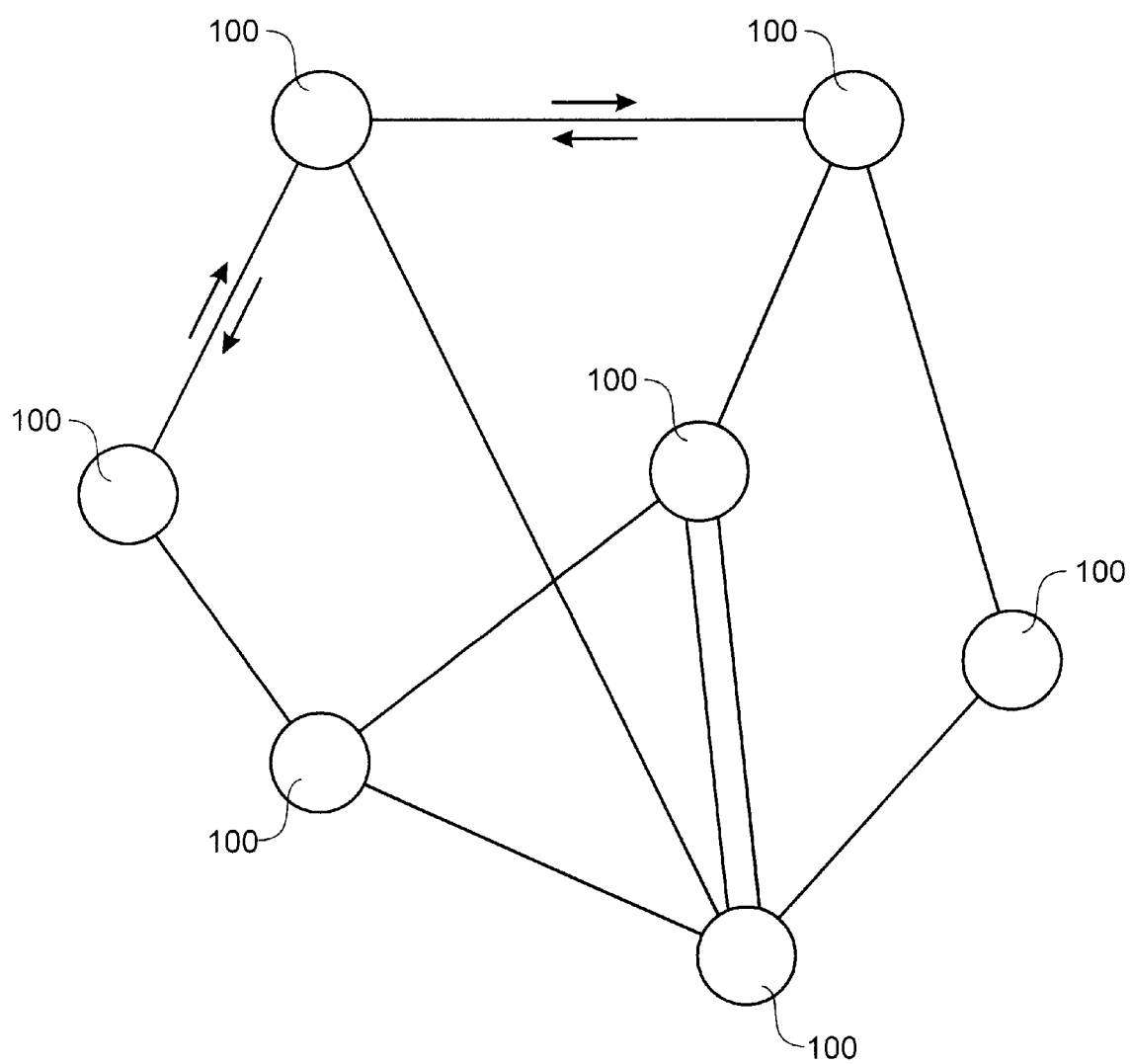
FIG. 1 is a schematic diagram of an optical network in accordance with the invention.

Referring now to FIG. 1, an optical network is shown having a plurality of nodes 100, capable of receiving and transmitting optical signals to one another. An optical network of this kind provides the capability of routing optical signals, for example telecommunications signals from any one node to a plurality of other nodes, in the event of failure or faults on a particular bi-directional interconnecting waveguide or optical trunk.

Figure 2:
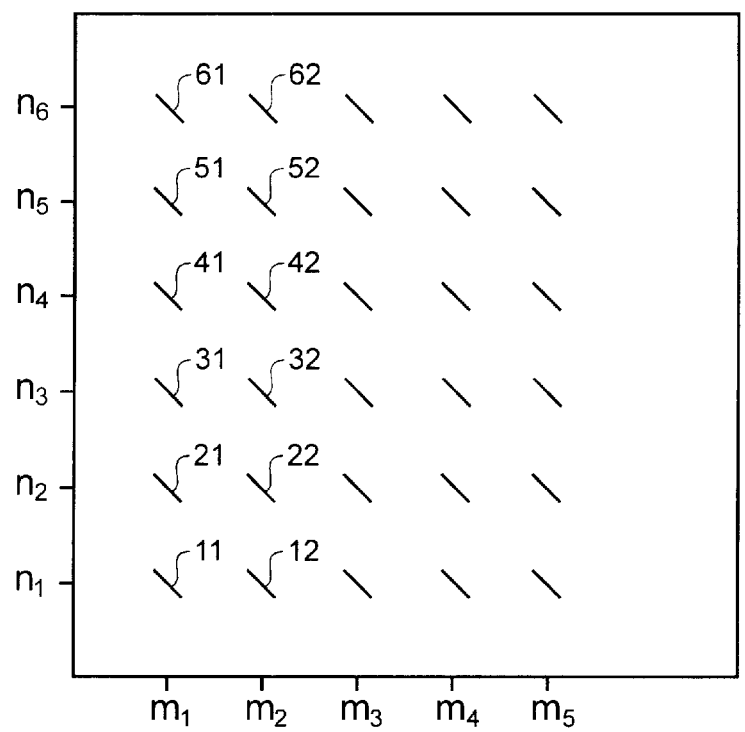
FIG. 2 is a schematic block diagram of a conventional n×m optical matrix switch.

Turning now to FIG. 2 a two-sided n×m optical matrix switch is shown having n input/output ports on one side, and m output/input ports along an adjacent side. These switches are well known; and, for example, one such switch is disclosed by Levinson in U.S. Pat. No. 4,580,873 issued Apr. 8, 1986 which is incorporated herein by reference.

In FIG. 2 the prior art two-sided matrix switch is shown having six input ports n1 . . . n6 and five output ports m1 . . . m5, however, since the ports are bi-directional, the input ports may serve as output ports and vice versa. In operation, a signal launched into one of the input ports, for example, n5 destined for output port m2, can be directed by lowering/removing mirror 51 out of the path and by ensuring that mirror 52 is present in the path so as to reflect light incident thereupon in a direction toward port m2. Mirrors 42, 32, 22, and 12 must also be moved out of the transmitting path between mirror 52 and port m2. Thus, by controlling the position of the mirrors, so that certain ones block and reflect light and others are moved out of the optical path, switching can occur between any input port n1 to n6 and any output port m1 to m5.

Figure 3:
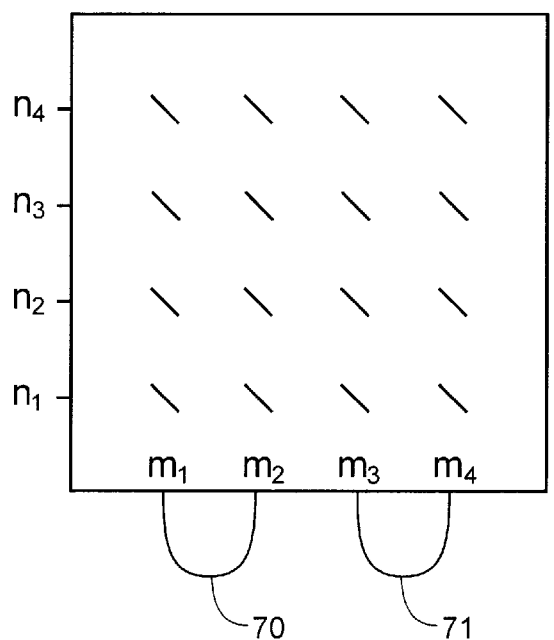
FIG. 3 is a schematic block diagram of an optical switch in accordance with this invention.

Referring now to FIG. 3, a single sided node switch in accordance with an embodiment of the invention is shown. The switch is similar to the n×m switch shown in FIG. 2, however includes loops in the form of waveguides 70 and 71 for looping ports m1 with m2 and m3 with m4 respectively. By so doing, the switch functions as a 1-sided switch capable of switching any input n1, n2, n3, or n4 to an other input n1, to n4. By providing this functionality, the optical network shown in FIG. 1 can be realized with little complexity and cost. The means for optically connecting any of the p ports with any other of the p ports, including mirrors 42, 32, 22 and 12, as well as waveguides 70, 71, operates in a wavelength independent manner.

Figure 4:
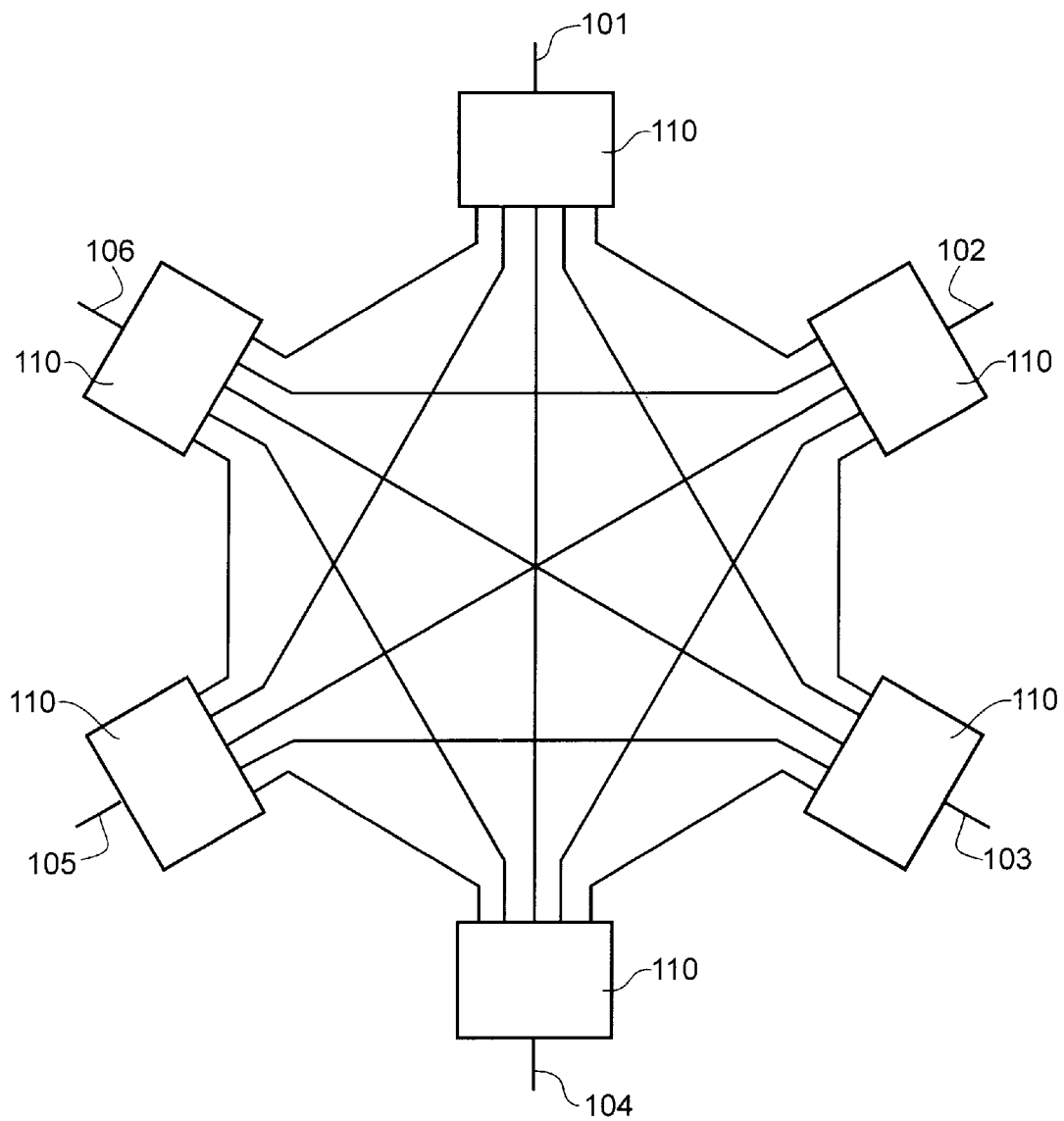
FIG. 4 is a schematic diagram of a detailed embodiment of the optical switch shown in FIG. 3.

FIG. 4 shows a preferred embodiment of a one-sided switch in accordance with the invention. Conveniently, this switch requires fewer switches than an equivalent matrix formed in FIG. 3. Since there is only one signal incident on each submatrix, i.e. each 1×5 switch, there is no cross talk at any input 101, . . . 106 port. In FIG. 4, six submatrix switches 110 are shown each having a single input port 101, 102, 103, 104, 105, or 106. In operation since all the submatrix switches 110 can be individually switched to direct input light energy at an input port to any one of five output ports; this configuration allows light launched into any switch 110 at an input port to be directed to any other submatrix switch within the group interconnected submatrix switches. In an alternative embodiment, one or more of the submatrix switches 110 can be replaced by a multicast splitter for broadcast to the remaining ports.

Of course numerous other embodiments may be envisaged without departing from the spirit and scope of the invention.

What is claimed is:

1. An optical switching system comprising:

p ports for receiving optical energy; and, means for optically connecting any of the p ports with any other of the p ports in a non-blocking manner, where p≧3, and where at least one of the p ports is a bi-directional port wherein the means for optically connecting any of the p ports with any other of the p ports includes a plurality of sub-switches each having means for switching an input signal to p-1 ports.

2. An optical switching system as defined in claim 1, wherein the means for optically connecting any of the p ports with any other of the p ports includes p sub-switches each having means for switching an input signal to p-1 ports.

3. An optical switching system as defined in claim 1, wherein the means for optically connecting any of the p ports with any other of the p ports includes p routers each having means for routing an input signal to p-1 ports.

4. An optical switching system as defined in claim 1, wherein the p ports for receiving optical energy are bi-directional ports.

5. An optical switching system as defined in claim 1 wherein said means for optically connecting any of the p ports with any other of the p ports operates in a wavelength independent manner.

6. An optical switching system as defined in claim 1, wherein p≧5.

7. An optical switching system comprising:

p ports for receiving optical energy; and, means for optically connecting any of the p ports with any other of the p ports in a non-blocking manner, wherein p≧3, and where at least one of the p ports is a bi-directional port, wherein the p ports include i×j sub ports and wherein the means for optically connecting any of the p ports with any other of the p ports includes means for reflecting optical energy from any of the i sub ports to any of the j sub ports and routing means for routing light from one of, at least one of the i sub ports to at least an other of the i sub ports and at least one of the j sub ports to at least an other of the j sub ports.

8. An optical switching system, comprising a plurality of interconnected optical switches, each switch comprising a predetermined number of ports for receiving optical energy, at least one of the ports being a bi-directional port; and, wavelength independent means for optically connecting any of the ports with any other of the other ports in a non-blocking manner, where for each switch the number is greater than or equal to three.

* * * * *